United States Patent
Kimura et al.

(10) Patent No.: US 8,406,624 B2
(45) Date of Patent: Mar. 26, 2013

(54) DEGREE EXTENDING METHOD AND OPTICAL HUB NODE APPARATUS

(75) Inventors: Gaku Kimura, Kawasaki (JP); Takayuki Shimizu, Kawasaki (JP); Taro Asao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 633 days.

(21) Appl. No.: 12/546,257

(22) Filed: Aug. 24, 2009

(65) Prior Publication Data

US 2010/0111527 A1    May 6, 2010

(30) Foreign Application Priority Data

Oct. 31, 2008    (JP) .................. 2008-281758

(51) Int. Cl.
*H04J 14/00* (2006.01)
(52) U.S. Cl. ................ 398/49; 398/50; 398/83
(58) Field of Classification Search ......... 398/48–50, 398/83
See application file for complete search history.

(56) References Cited

U.S. PATENT DOCUMENTS

| | | | |
|---|---|---|---|
| 6,084,694 A | 7/2000 | Milton | |
| 6,493,117 B1 | 12/2002 | Milton | |
| 6,529,300 B1 | 3/2003 | Milton | |
| 6,556,321 B1 | 4/2003 | Milton | |
| 6,631,018 B1 | 10/2003 | Milton | |
| 2002/0048066 A1* | 4/2002 | Antoniades et al. | 359/128 |
| 2002/0126334 A1 | 9/2002 | Milton | |
| 2002/0186434 A1* | 12/2002 | Roorda et al. | 359/128 |
| 2003/0170026 A1 | 9/2003 | Milton | |
| 2003/0170027 A1 | 9/2003 | Milton | |
| 2004/0141746 A1 | 7/2004 | Oberg | |
| 2006/0098981 A1 | 5/2006 | Miura et al. | |
| 2006/0140625 A1 | 6/2006 | Ooi | |
| 2008/0138068 A1* | 6/2008 | Akiyama et al. | 398/50 |
| 2008/0232800 A1* | 9/2008 | Jensen | 398/48 |
| 2010/0172646 A1* | 7/2010 | Colbourne | 398/49 |

FOREIGN PATENT DOCUMENTS

| | | |
|---|---|---|
| JP | 11-331224 | 11/1999 |
| JP | 2002-27513 | 1/2002 |
| JP | 2004-527945 | 9/2004 |
| JP | 2006-140598 | 6/2006 |
| JP | 2006-191212 | 7/2006 |

OTHER PUBLICATIONS

Japanese Office Action for application No. 2008-281758 issued Sep. 11, 2012.

* cited by examiner

*Primary Examiner* — Nathan Curs
(74) *Attorney, Agent, or Firm* — Staas & Halsey LLP

(57) ABSTRACT

An optical hub node apparatus can be configured to include N+1 or more route units (10) by connecting N or less route units (10) selected from among the N+1 or more route units (10) to a route unit (10) including N (N:integer of 2 or more) ports to which other route units (10) are detachably connected. As a result, as compared with a case where N+1 route units (10) are completely interconnected in a meshed manner, the number of the route units (10) can be increased. Thus, the number (degree) of optical transmission apparatuses connectable to the optical hub node apparatus can be increased.

9 Claims, 15 Drawing Sheets

DEGREE EXTENDING METHOD AND OPTICAL HUB NODE APPARATUS

CROSS-REFERENCE TO RELATED APPLICATION

The disclosure of Japanese Patent Application No. JP2008-281758 filed on Oct. 31, 2008 including the specification, claims, drawings and abstract is incorporated herein by reference in its entirety.

FIELD

The disclosures made herein relate to a technology of wavelength division multiplexing (WDM).

BACKGROUND

A WDM network often employs ring-type or mesh-type network topology. In the WDM network of any type, a plurality of node apparatuses are interconnected via a route. The route is a communication path that interconnects the node apparatuses, and includes a pair of optical fibers for transmission and reception. It should be noted that the node apparatus is called an optical node apparatus when node apparatus directly processes and outputs an optical signal without converting the input optical signal into an electric signal. In the specification, a node apparatus that converts an input optical signal into an electric signal to process the optical signal or the electric signal, and the optical node apparatus are generically named an optical transmission apparatus. An optical node apparatus that interconnects a plurality of ring-type networks, or an optical node apparatus that constitutes a mesh-type network is called an optical hub node apparatus that includes three or more routes to other optical transmission apparatuses and switches the plurality of routes.

The optical hub node apparatus incorporates a plurality of route units as interfaces for connection with other optical transmission apparatuses. In the optical hub node apparatus, all the route units are connected to all the other route units via the optical fibers for transmission and reception. In other words, in the optical hub node apparatus, the plurality of route units for transmission and reception are completely interconnected in a meshed manner. The route unit separates an optical signal of an arbitrary channel (wavelength) from optical signals input through an uplink (reception) optical fiber from the other optical transmission apparatuses to output the optical signal to an arbitrary route unit. The route unit couples together optical signals of one or more channels input from the other route units to output the coupled optical signals to the other optical transmission apparatuses through a downlink (transmission) optical fiber.

In the aforementioned WDM network, optical transmission apparatuses or routes may be added as demand thereof increases. However, the number of route units incorporated in the optical hub node apparatus is predetermined, and hence the number of optical transmission apparatuses (number of routes, degree, or number of edges) allowed to be connected to the optical hub node apparatus cannot be increased unlimitedly.

The following are related arts to the invention.
[Patent document 1] Japanese Patent Laid-Open Publication No. JP 2006-191212
[Patent document 2] Japanese Patent Laid-Open Publication No. JP 2004-527945
[Patent document 3] Japanese Patent Laid-Open Publication No. JP 11-331224

SUMMARY

According to an aspect of the disclosures made herein, a degree extension method for an optical hub node apparatus including three or more route units respectively connected to optical transmission apparatuses via routes so as to freely perform optical communication, the degree extension method including: providing each of the three or more route units so as to include N (integer of 2 or more) ports to which other route units are detachably connected; and connecting N or less route units selected from among N+1 or more route units to each of the three or more route units.

The objects and advantages of the invention will be realized and attained by means of the elements and combinations particularly pointed out in the claims.

DESCRIPTION OF EMBODIMENTS

Figure 1:
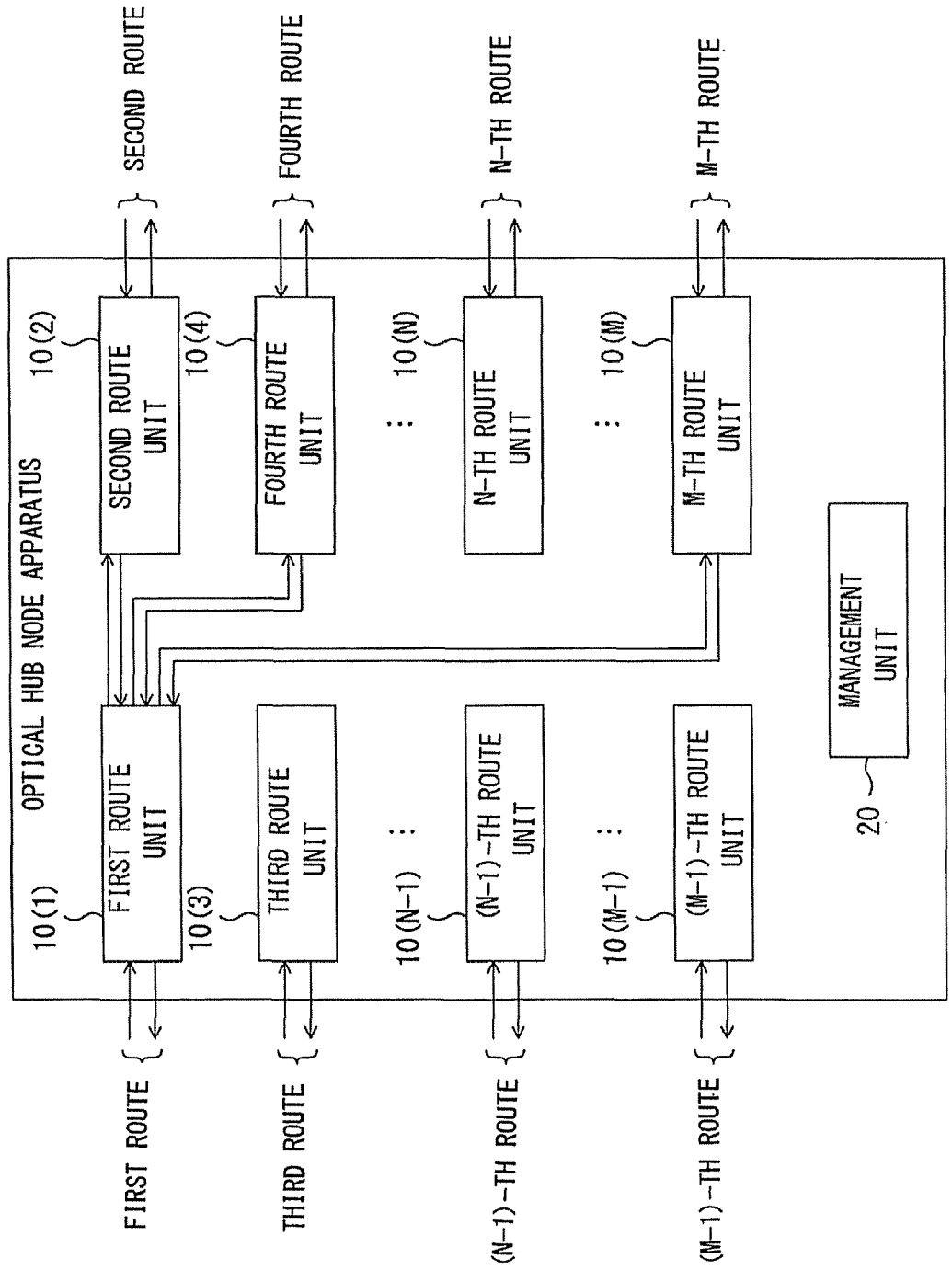
FIG. 1 is a block diagram illustrating a configuration of an optical hub node apparatus according to a first embodiment.

The embodiments of the disclosures made herein will be described below referring to the drawings in detail. The drawings illustrate preferred embodiments. It should be understood, however, that the embodiments can be implemented by many different embodiments, and are not limited to the embodiments described herein.

Hereinafter, referring to the accompanying drawings, four examples of an optical hub node apparatus which is an embodiment of the disclosed degree extending method are described.

It should be noted that the optical hub node apparatus described below is only an embodiment, and the disclosed degree extending method is not limited to a configuration described below.

Optical hub node apparatuses of first to fourth embodiments are used as optical node apparatuses including three or more routes to other optical transmission apparatuses (optical node apparatuses or node apparatuses) in a wavelength division multiplexing (WDM) network having ring-type or mesh-type network topology. The route is a communication path for connecting optical node apparatuses together, or an optical node apparatus with a node apparatus, and includes a pair of optical fibers for transmission and reception. The optical hub node apparatus is a node apparatus that directly processes and outputs an optical signal without converting the input optical signal into an electric signal. Hereinafter, the transmission optical fiber may be referred to as a downlink optical fiber, and the reception optical fiber may be referred to as an uplink optical fiber.

First Embodiment

[Configuration]

FIG. 1 is a block diagram illustrating a configuration of an optical hub node apparatus according to a first embodiment.

The optical hub node apparatus of the first embodiment includes M route units 10 where M is an integer of 3 or more, and a management unit 20. It should be noted that the M route units 10 are described as first to M-th route units 10(1) to 10(M) when they have to be distinguished from one another. The management unit 20 is a unit that monitors a communication state of the M route units 10.

Each of the M route units 10 includes an external port to which an optical transmission apparatus (not shown) is connected via a pair of uplink and downlink optical fibers constituting one route. When N is an integer of 2 or more and less than M, each of the M route units 10 includes N internal ports to which other route units 10 are connected via pairs of uplink and downlink optical fibers. In the first embodiment, some or all of the M route units 10 are connected to N or less arbitrary other route units 10. Some of the M route units 10 are not connected to any route units 10. Which route unit 10 is connected to which route unit 10, and which route unit 10 is set in an unconnected state are changed according to an installing situation of the optical hub node apparatus of the first embodiment in the WDM network. FIG. 1 illustrates only a connection state of the first route unit 10(1) with other route units 10 as an example. The route unit 10 separates an optical signal of an arbitrary channel (wavelength) from optical signals input from another optical transmission apparatus (not shown) through the uplink optical fiber to output the optical signal to an arbitrary route unit 10. The route unit 10 couples together optical signals of one or more channels input from other route units 10 to output the coupled optical signal to another optical transmission apparatus (not shown) through the downlink optical fiber.

Figure 2:
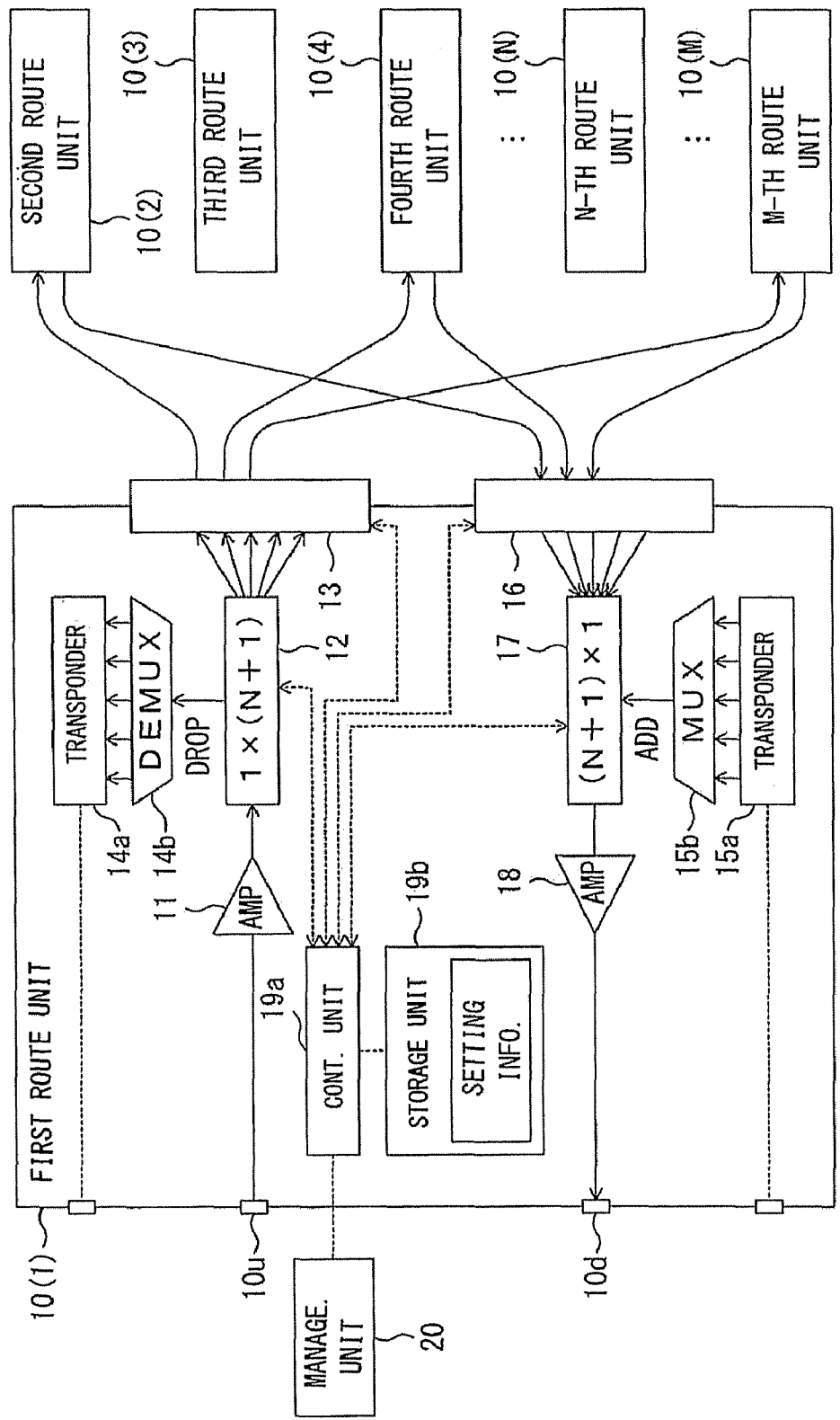
FIG. 2 is a block diagram illustrating a configuration of a first route unit.

FIG. 2 is a block diagram illustrating a configuration of the first route unit 10(1). It should be noted that the second to M-th route units 10(2) to 10(M) are similar in configuration to the first route unit 10(1) illustrated in FIG. 2.

The first route unit 10(1) includes a first optical amplifier (AMP) 11, a 1×(N+1) optical switch 12, N uplink internal ports 13, a first transponder 14a, a demultiplexer (DEMUX) 14b, a second transponder 15a, a multiplexer (MUX) 15b, N downlink internal ports 16, an (N+1)×1 optical switch 17, a second optical amplifier (AMP) 18, a control unit 19a, and a storage unit 19b.

The first optical amplifier 11 is an optical element that amplifies a signal level of a multiple optical signal input from another optical transmission apparatus (not shown) via an uplink external port 10u. The multiple optical signal whose signal level has been amplified by the first optical amplifier 11 is output to the 1×(N+1) optical switch 12.

Figure 3:
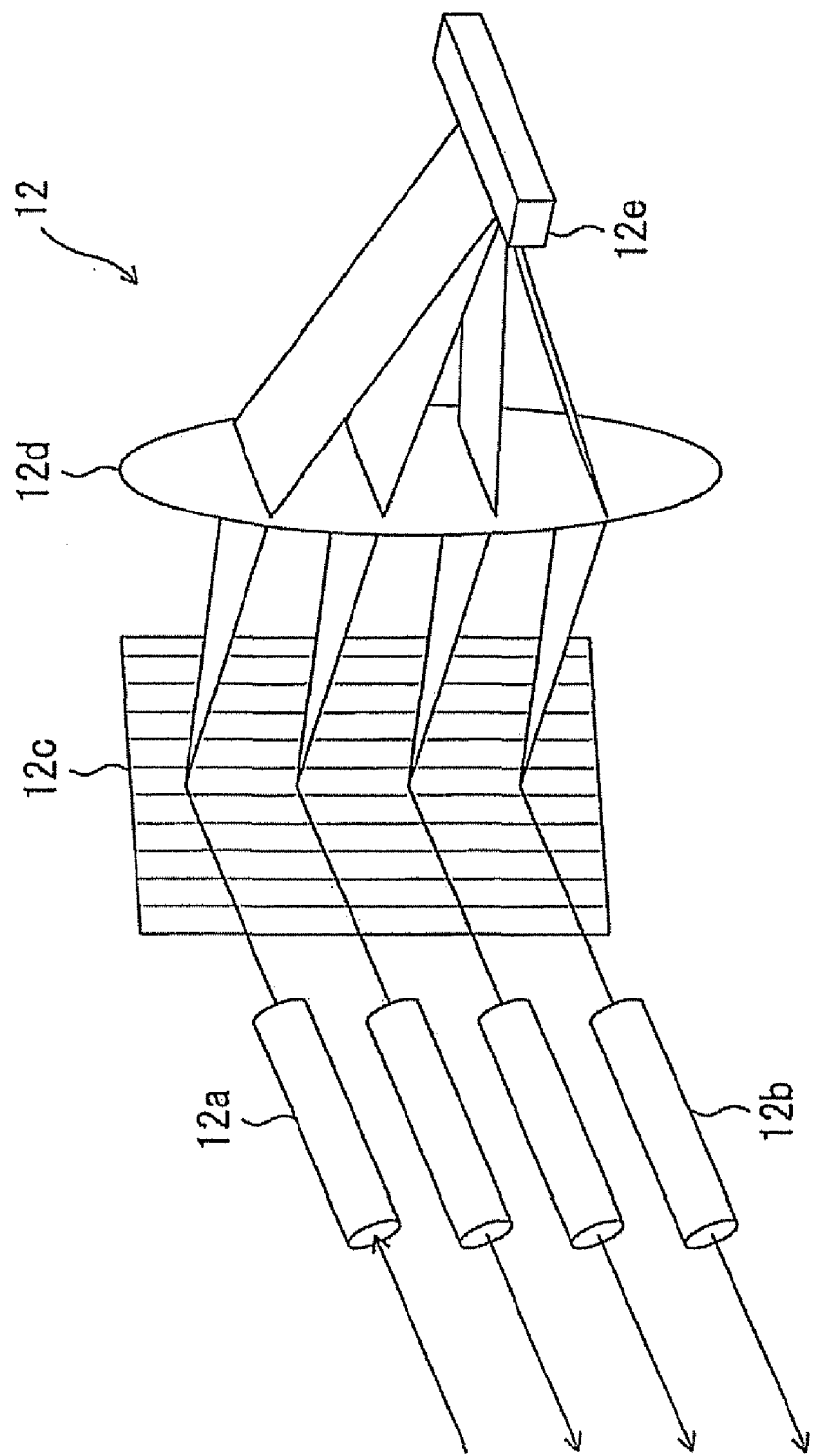
FIG. 3 is a diagram illustrating an example of a configuration of a 1×(N+1) optical switch.

The 1×(N+1) optical switch 12 is an optical element that separates optical signals of channels (wavelengths) specified by the control unit 19a from the multiple optical signals input from the first optical amplifier 11 to output the optical signals to N uplink internal ports 13 or the demultiplexer 14b. In other words, the 1×(N+1) optical switch 12 is a wavelength selective switch (WSS). The 1×(N+1) optical switch 12 mainly includes a spectroscopic device that separates an optical signal from multiplexed optical signals of multiple channels (multiple wavelengths) for each channel, for example, a diffraction grating or planar lightwave circuit-arrayed waveguide grating (PLC-AWG), a switching device that switches a course of an optical signal for each channel, for example, a planar lightwave circuit-thermal optical (PLC-TO) switch, and a liquid crystal or a micro electro mechanical systems (MEMS) mirror. FIG. 3 illustrates an example of a configuration of the 1×(N+1) optical switch 12. The 1×(N+1) optical switch 12 illustrated in FIG. 3 includes one input side collimator 12a and N+1 output side collimators 12b. The 1×(N+1) optical switch 12 illustrated in FIG. 3 includes a diffraction grating 12c and a lens 12d as spectroscopic devices, and a MEMS mirror 12e as a switching device. A multiple optical signal input from the first optical amplifier 11 to the input side collimator 12a is subjected to spectroscopy by the diffraction grating 12c, and rectified as a parallel light by the lens 12d to be input to the MEMS mirror 12e. The MEMS mirror 12e includes a mirror whose tilt angle is freely controlled for each channel, and the optical signal subjected to spectroscopy by the diffraction grating 12c and the lens 12d is input to a mirror of a corresponding channel. Under control of a tilt angle of each mirror, the optical signal of each channel is reflected to the output side collimator 12b specified by the control unit 19a, and output to the internal port 13 or the demultiplexer 14b to which the output side collimator 12b is optically connected.

The uplink internal ports 13 are interfaces connected to the downlink internal ports 16 of the other route units 10(2) to 10(M) via the optical fibers. Each uplink internal port 13 includes a connector socket to which a connector plug disposed in a tip end of the optical fiber is detachably fixed. The first route unit 10(1) includes the N uplink internal ports 13. Thus, N or less route units 10 selected from the other route units 10(2) to 10(M) can be connected to the first route unit 10(1).

The first transponder 14a is a device that includes a receiver positive (RXP) interface for wavelength-converting a predetermined optical signal to output the optical signal to an apparatus of a reception destination for each channel. The demultiplexer 14b is an optical element that selects an RXP interface corresponding to a channel of an optical signal input from the 1×(N+1) optical switch 12 from the first transponder 14a to output the optical signal to the selected RXP interface. As the demultiplexer 14b, for example, PLC-AWG is available.

An optical signal of an arbitrary channel is taken out from the multiple optical signal by the 1×(N+1) optical switch 12, the demultiplexer 14b, and the first transponder 14a, which are described above, to be output to another apparatus. In other words, an optical signal of an arbitrary channel is pulled out (DROP).

The second transponder 15a is a device that includes, for each channel, a transmitter positive (TXP) interface for wavelength-converting an optical signal from a transmission source apparatus into an optical signal of a predetermined channel. The multiplexer 15b is an optical element that selects optical signals of a plurality of channels input from the TXP interfaces of the second transponder 15a, and inputs the selected optical signals to the (N+1)×1 optical switch 17. As the multiplexer 15b, for example, PLC-AWG is available.

The downlink internal port 16 is an interface connected to an uplink internal port 13 of each of the other route units 10(2) to 10(M) via an optical fiber. The downlink internal port 16 includes a connector socket to which a connector plug disposed in a tip end of the optical fiber is detachably fixed. The first route unit 10(1) includes the N downlink internal ports 16. N or less route units 10 selected from among the other route units 10(2) to 10(M) can accordingly be connected to the first route unit 10(1).

Figure 4:
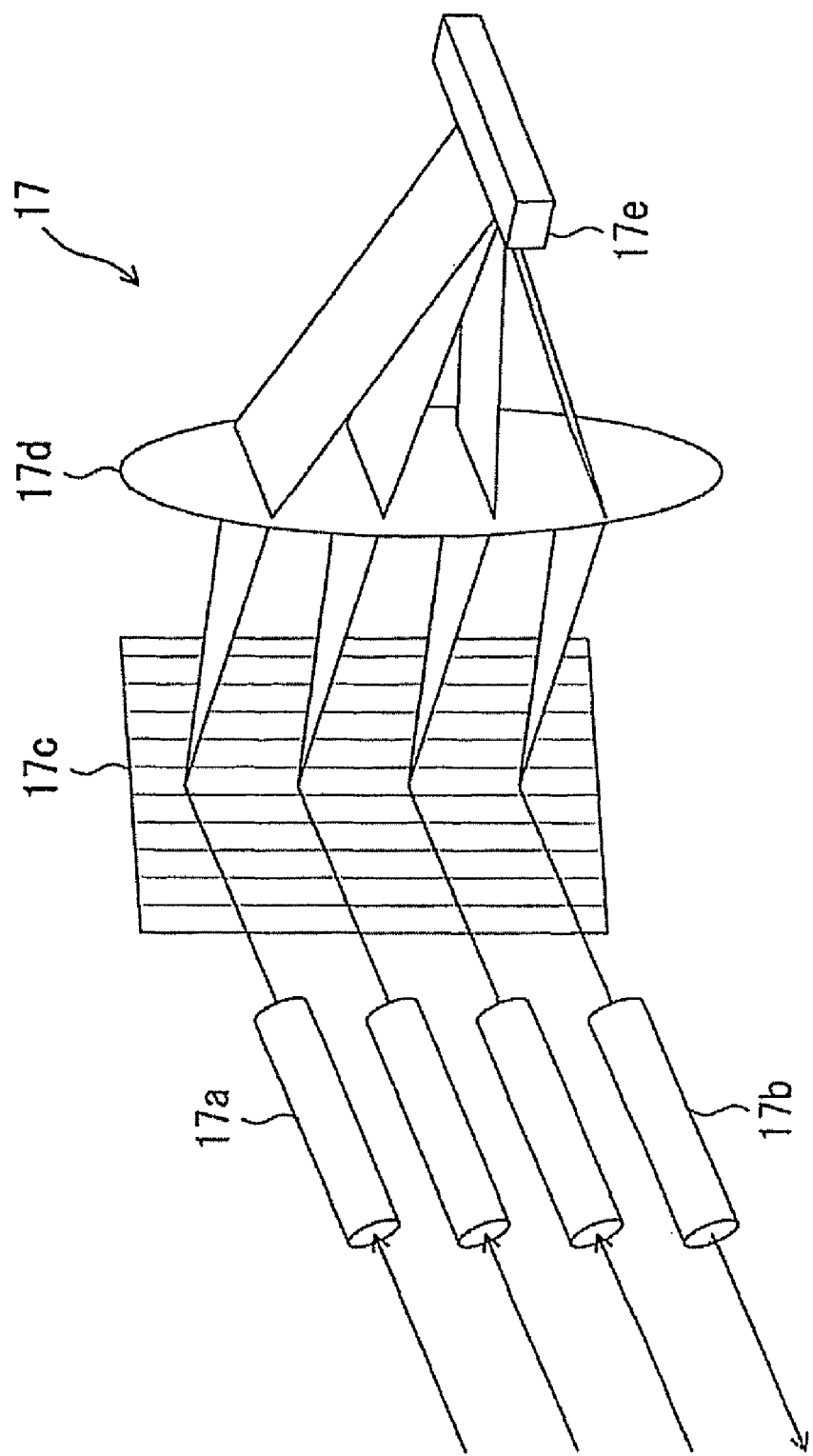
FIG. 4 is a diagram illustrating an example of a configuration of an (N+1)×1 optical switch.

The (N+1)×1 optical switch 17 is an optical element that once separates optical signals input from the multiplexer 15b or the downlink internal ports 16 for each channel, and then couples the optical signals as a multiplexed multiple-channel (multiple-wavelength) optical signal to output the optical signal to the second optical amplifier 18. The (N+1)×1 optical switch 17 is a wavelength selective switch as in the case of the 1×(N+1) optical switch 12, and mainly includes a spectroscopic device and a switching device. FIG. 4 illustrates an example of a configuration of the (N+1)×1 optical switch 17. The (N+1)×1 optical switch 17 illustrated in FIG. 4 includes, conversely to the 1×(N+1) optical switch 12 illustrated in FIG. 3, N+1 input side collimators 17a and one output side collimator 17b. The input side collimator 17a is optically connected to the multiplexer 15b and the downlink internal port 16, and the output side collimator 17b is connected to the second optical amplifier 18. Optical signals input from the multiplexer 15b or the downlink internal ports 16 to the input side collimators 17a are once subjected to spectroscopy by a diffraction grating 17c, and rectified as parallel lights by a lens 17d to be input to a MEMS mirror 17e. Under control of a tilt angle of the mirror in the MEMS mirror 17e, all the optical signals of the channels subjected to spectroscopy by the diffraction grating 17c and the lens 17d are reflected toward the output side collimator 17b to be coupled as a multiple optical signal. The coupled multiple optical signal is output to the second optical amplifier 18 via the output side collimator 17b.

Optical signals input from other apparatuses via the second transponder 15a, the multiplexer 15b, and the (N+1)×1 optical switch 17, which are described above, are converted into optical signals of an arbitrary channel to be multiplexed into the multiple optical signal. In other words, optical signals of an arbitrary channel are inserted (ADD).

The second optical amplifier 18 is an optical element that amplifies a signal level of the multiple optical signal input from the (N+1)×1 optical switch 17. The multiple optical signal whose signal level has been amplified by the second optical amplifier 18 is output to another optical transmission apparatus (not shown) via a downlink external port 10d.

The control unit 19a performs switching control of the 1×(N+1) optical switch 12 and the (N+1)×1 optical switch 17 and connection management of the internal ports 13 and 16.

The control unit 19a performs the switching control based on setting information in the storage unit 19b. The setting information indicates the internal ports 13 and 16 of which of the route units 10 the internal ports 13 and 16 of the route unit 10 are connected to, or whether the internal ports 13 and 16 are connected to none of the route units 10. The N uplink internal ports 13 and the N downlink internal ports 16 in the route unit 10 contain pieces of identification information allocated beforehand for identifying the internal ports 13 and 16. For the setting information, identification information indicating an uplink internal port 13 of an own unit and identification information of a downlink internal port 16 of another route unit 10 connected to this uplink internal port 13 are stored in association with each other as the setting information in the storage unit 19b. For internal ports 13 and 16 not connected to another route unit 10, only pieces of identification information thereof are stored as the setting information in the storage unit 19b. In switching control of the optical switches 12 and 17, the control unit 19a controls the MEMS mirror 12e of the 1×(N+1) optical switch 12 so that an optical signal of an arbitrary channel can be transmitted to an appropriate route unit 10, and outputs the optical signal to an uplink internal port 13 to which the route unit 10 is connected. The control unit 19a is electrically connected to a control unit 19a of the route unit 10 of the output destination to notify of which of the uplink internal ports 13 an optical signal of an arbitrary channel has been output from.

The control units 19a of all the route units 10 are connected to the management unit 20 of the optical hub node apparatus. The control unit 19a performs connection management of the internal ports 13 and 16 in cooperation with the management unit 20.

Figure 5:
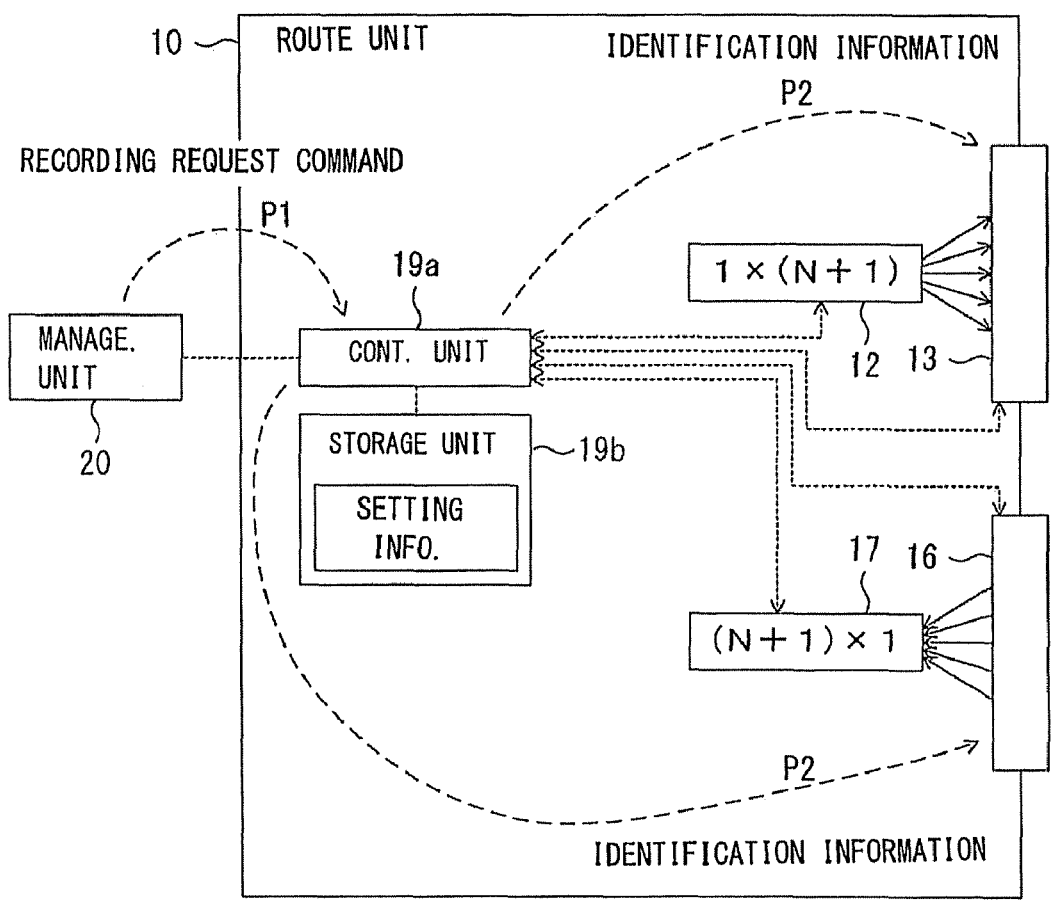
FIG. 5 is a diagram illustrating contents of processing regarding connection management of an internal port performed by a control unit.
Figure 6:
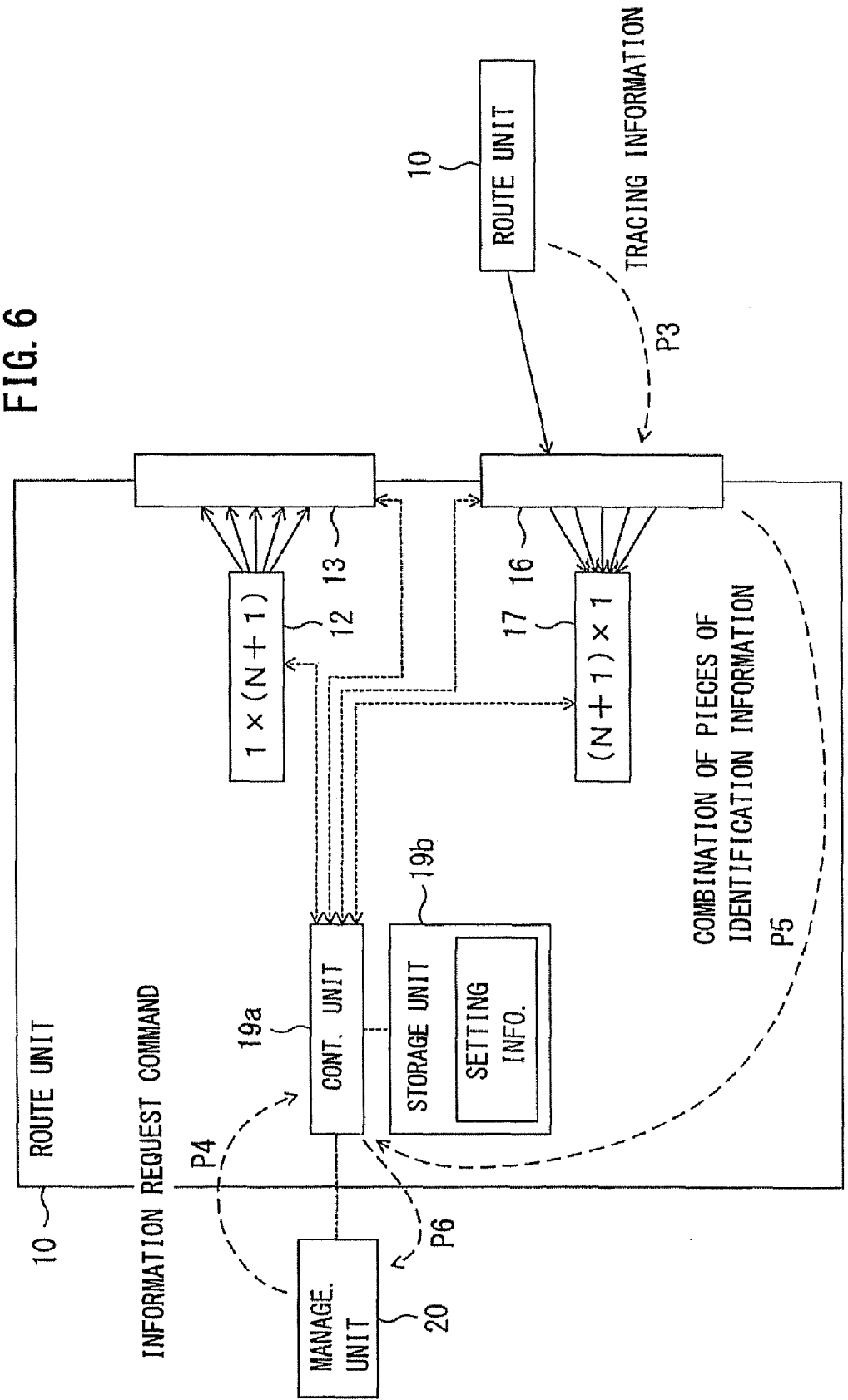
FIG. 6 is a diagram illustrating contents of processing regarding connection management of the internal port performed by the control unit.

FIGS. 5 and 6 illustrate contents of processing regarding connection management of the internal ports 13 and 16 performed by the control unit 19a.

In the first embodiment, the management unit 20 transmits a predetermined recording request command to the control unit 19a of each route unit 10 at predetermined time. The control unit 19a stores, after reception of pieces of identification information of the uplink and downlink internal ports 13 and 16 of the own unit together with the predetermined recording request command from the management unit 20, the identification information in the storage unit 19b as indicated by P1 of FIG. 5, and records the identification information in registers of the internal ports 13 and 16 as indicated by P2 of FIG. 5. In other words, pieces of identification information are allocated to the internal ports 13 and 16 of each route unit 10 by the management unit 20.

In the first embodiment, when optical fibers are physically connected to any one of the internal ports 13 and 16, as indicated by P3 of FIG. 6, identification information of an uplink internal port 13 of one route unit 10 is transmitted as tracing information to a downlink internal port 16 of the other route unit 10. Specifically, the uplink internal port 13 has a function of multiplexing an optical signal of a control channel different from its channel on an optical signal transmitted to the other route unit 10. The downlink internal port 16 has a function of separating an optical signal of a control channel from optical signals received from the other route unit 10. When optical fibers are physically connected to both of the internal ports 13 and 16, through the control channel, the uplink internal port 13 of one route unit 10 transmits own identification information stored in its own register to the opposite side. The downlink internal port 16 of the other route unit 10 records, after reception of identification information of the opposite side, the identification information in a predetermined register.

The management unit 20 periodically transmits predetermined information request commands to the control unit 19a of the route units 10. After reception of the predetermined information request command from the management unit 20 as indicated by P4 of FIG. 6, the control unit 19a reads, from the register of the downlink internal port 16 of its own unit, identification information of the downlink internal port 16 and identification information (tracing information) of an uplink internal port 13 of the other route unit 10 connected to the downlink internal port 16 as indicated by P5 of FIG. 6. Then, the control unit 19a combines the read pieces of identification information to transmit the combination thereof to the management unit 20 as indicated by P6 of FIG. 6. After reception of the combination of the received pieces of identification information, the management unit 20 stores this. It should be noted that the register of the downlink internal port 16 corresponds to a first storage unit.

With the aforementioned function, the management unit 20 is notified of the combination of the physically connected uplink and downlink internal ports 13 and 16. Thus, a network administrator who operates the management unit 20 can check a connection state of all the route units 10 in the optical hub node apparatus.

[Operation]

Figure 7:
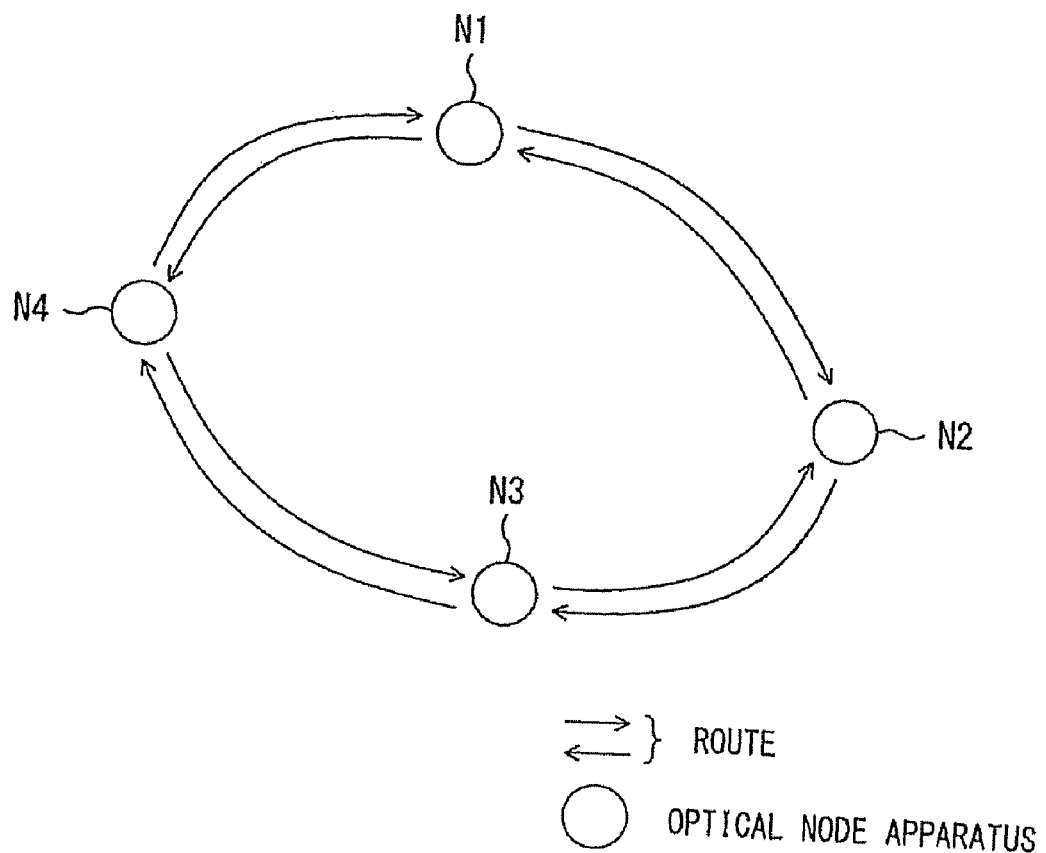
FIG. 7 is a diagram illustrating an example of a WDM network.
Figure 8:
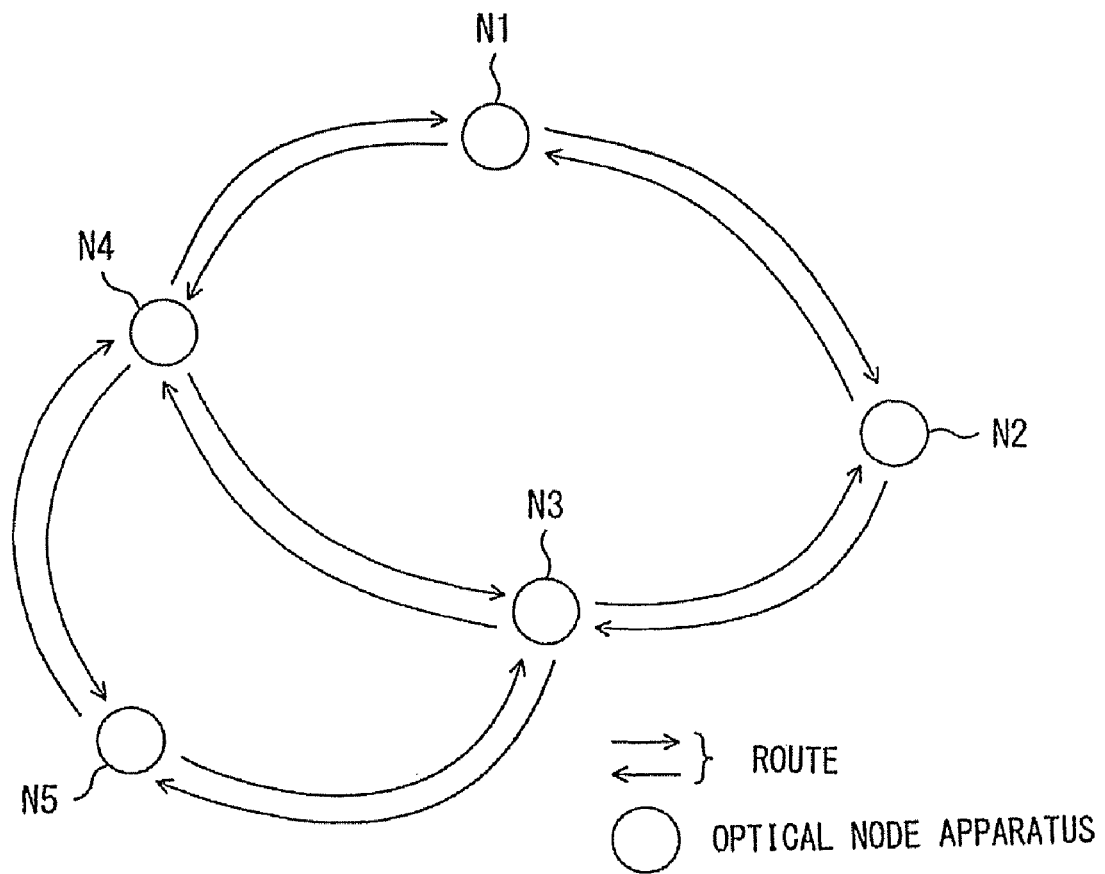
FIG. 8 is a diagram illustrating an extension example of the WDM network illustrated in FIG. 7.

In the WDM network, optical transmission apparatuses or routes may be added as demand thereof increases. FIG. 7 illustrates an example of the WDM network. The WDM network illustrated in FIG. 7 includes four optical node apparatuses N1 to N4 interconnected in a ring manner. In other words, the WDM network illustrated in FIG. 7 includes ring-type network topology. In such a WDM network as illustrated in FIG. 7, for example, as illustrated in FIG. 8, it is assumed that an optical node apparatus N5 is added between the third and fourth optical node apparatuses N3 and N4, and connected to the third and fourth optical node apparatuses N3 and N4. In this case, the third and fourth optical node apparatuses N3 and N4 become optical hub node apparatuses because they have three or more routes.

In this case, for example, there is a path directly reaching the fourth optical node apparatus N4 from the fifth optical node apparatus N5, and hence a path reaching the fourth optical node apparatus N4 from the fifth optical node apparatus N5 via the third optical node apparatus N3 is made unnecessary.

Figure 9:
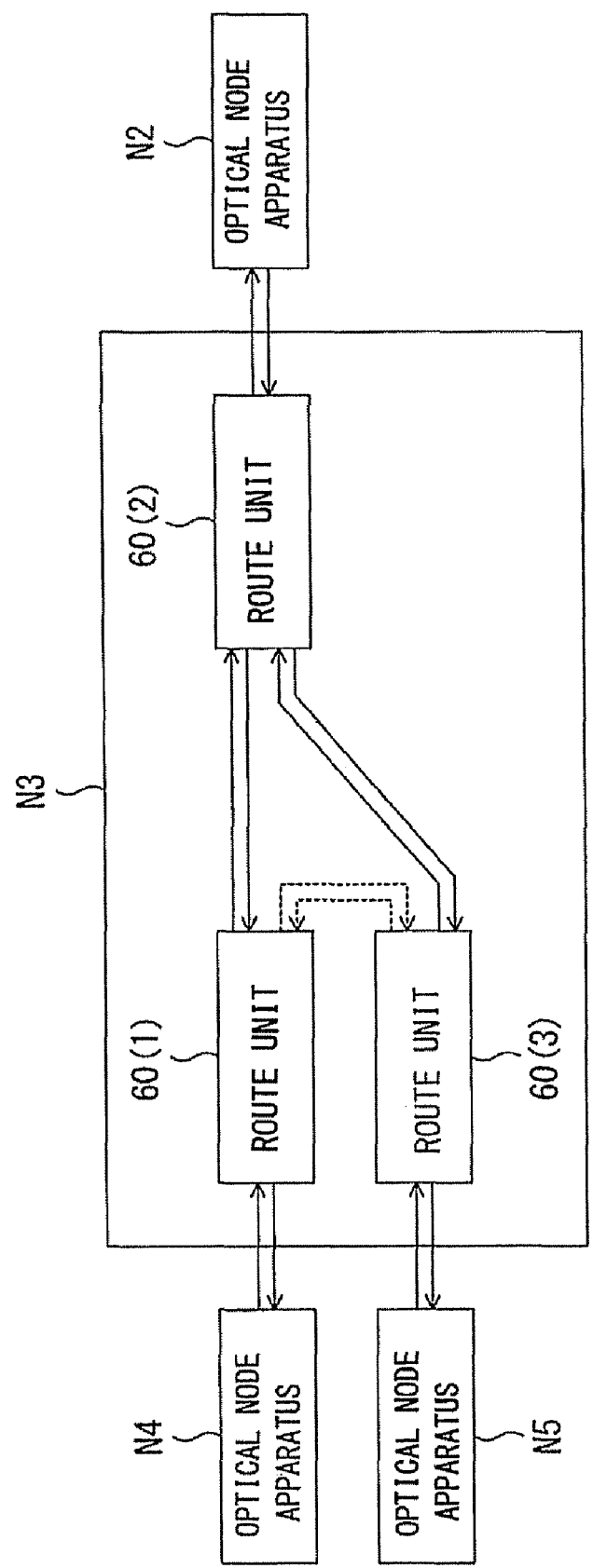
FIG. 9 is a block diagram illustrating a configuration of a conventional optical hub node apparatus.

This means, for example, if the third optical node apparatus N3 is a conventional optical hub node apparatus in which three route units 60(1) to 60(3) are completely interconnected in a meshed manner as illustrated in FIG. 9, that when the fourth, second and fifth optical node apparatuses N4, N2 and N5 are respectively connected to the first to third route units 60(1) to 60(3), connection (connection indicated by broken line of FIG. 9) between the first route unit 60(1) connected to the fourth optical node apparatus N4 and the third route unit 60(3) connected to the fifth optical node apparatus N5 is unnecessary.

However, in the conventional optical hub node apparatus illustrated in FIG. 9, even if connection between the first and third route units 60(1) and 60(3) is unnecessary, the connection cannot be released to connect the route units 60(1) and 60(3) to an other route unit 60 for extension of the WDM network.

There is an idea that an optical hub node apparatus having many route units 60 mounted thereon may be incorporated beforehand in the WDM network in anticipation of extension of the WDM network. In this case, in the optical hub node apparatus, the route units 60 are completely interconnected in a meshed manner, and there is superfluous connection between a route unit having an existing optical transmission apparatus connected thereto and an unused route unit. Only connecting the added optical transmission apparatus to the unused route unit accordingly enables extension of the WDM network. However, an optical switch incorporated in the route unit 60 is more expensive as a value of N is larger. Thus, as the number of route units 60 mounted in the apparatus becomes larger, route units, in other words, optical hub node apparatuses, become more expensive, increasing facility costs of the WDM network. An optical hub node apparatus that uses inexpensive optical splitters in place of the optical switches as in the case of a third embodiment described later may be employed. However, intensity of a multiple optical signal separated by the optical splitter is lower as a value of N is larger, and hence the optical amplifier is made necessary. As a result, the optical hub node apparatus becomes not so inexpensive, disabling suppression of an increase of facility costs of the WDM network.

Figure 10:
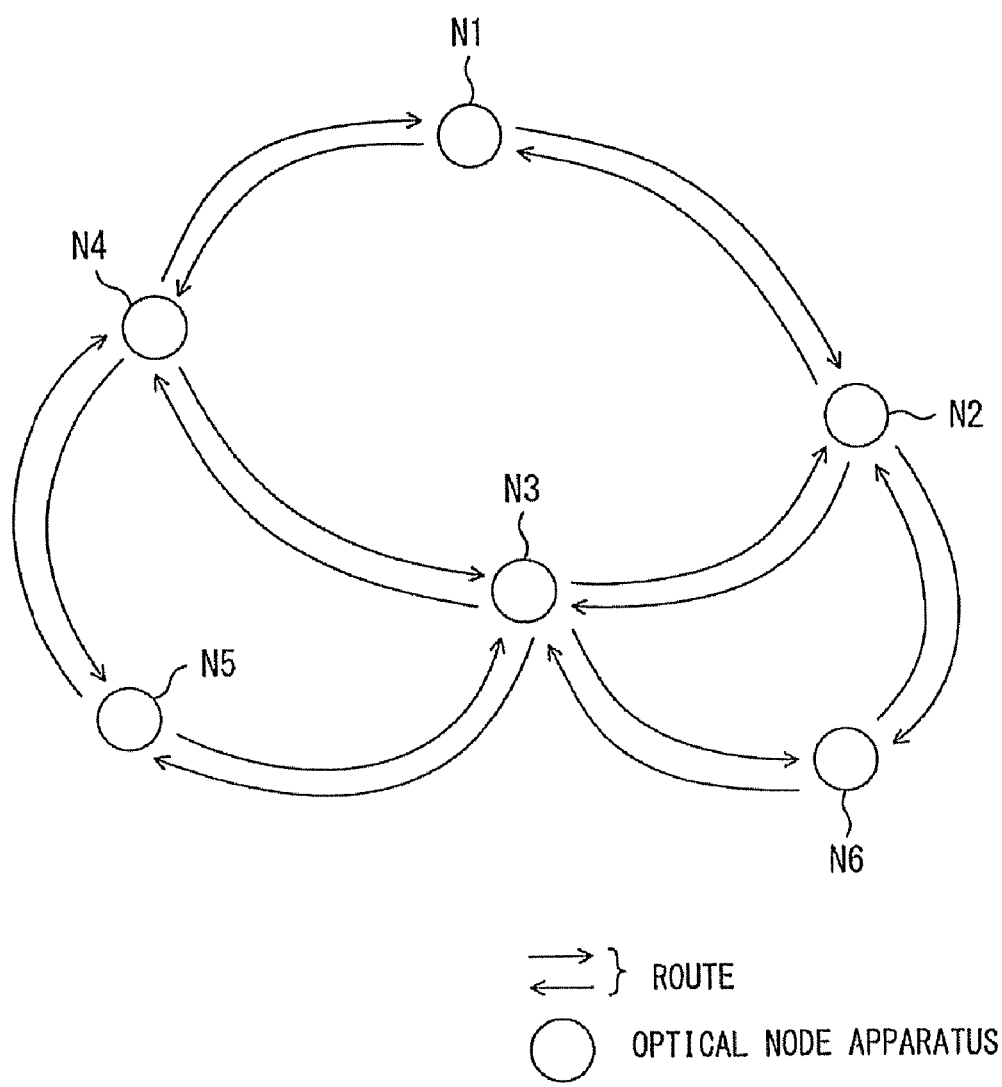
FIG. 10 is a diagram illustrating an extension example of the WDM network illustrated in FIG. 8.
Figure 11:
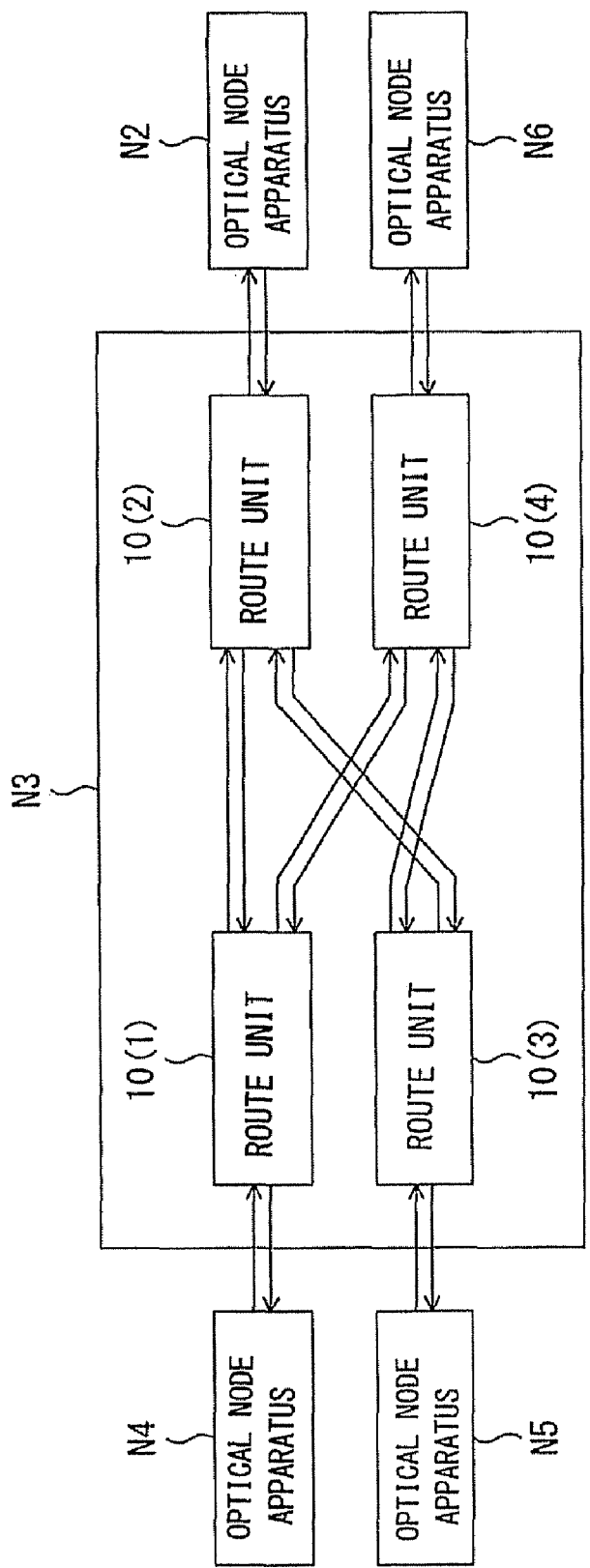
FIG. 11 is a diagram illustrating an example in which the optical hub node apparatus of the first embodiment is applied to the WDM network of FIG. 10.

On the other hand, in the optical hub node apparatus of the first embodiment (refer to FIG. 2), interconnecting the uplink and downlink internal ports 13 and 16 through the optical fibers enables interconnection of arbitrary route units 10. As a result, even when the WDM network illustrated in FIG. 8 is further extended by adding a sixth optical node apparatus N6 between the third and second optical node apparatuses N3 and N2 as illustrated in FIG. 10, the third optical node apparatus N3 may be configured by adding a fourth route unit 10(4) as illustrated in FIG. 11. In the extension examples of FIGS. 10 and 11, connection between the added fourth route unit 10(4) and the second route unit 10(2) is unnecessary for the same reason as that of the cases of FIGS. 8 and 9. Thus, the added fourth route unit 10(4) only needs to be connected to the first and third route units 10(1) and 10(3). In the extension examples of FIGS. 10 and 11, N=2 and M=3 are established.

Thus, according to the first embodiment, the number of route units 10 can be increased in the optical hub node apparatus. As a result, the number of optical transmission apparatuses (number of routes, degree, or number of edges) connectable to the optical hub node apparatus can be increased.

According to the first embodiment, without replacing the route units in the optical hub node apparatus by any expensive route units in which the numbers of internal ports 13 and 16 (value of N) are increased, route units similar to the route units 10 incorporated beforehand in the optical hub node apparatus only need to be added. Thus, a price increase of the optical hub node apparatus can be suppressed, and an increase of facility costs of the WDM network can be suppressed.

According to the first embodiment, the number of route units disposed in the optical hub node apparatus can be unlimitedly increased by, for example, cascade-connecting the route units theoretically irrespective of the number of ports of each route unit.

According to the first embodiment, by physically interconnecting the route units 10 through the optical fibers, a connection state is recognized by the route units 10. Thus, the control units 19a of the route units 10 can control to which of the uplink internal ports 13 the 1×(N+1) optical switches 12 output optical signals.

According to the first embodiment, by physically interconnecting the route units 10 through the optical fibers, the management unit 20 is notified of a connection state. Thus, the network administrator who operates the management unit 20 can easily check the connection state of the route units 10.

Second Embodiment

A second embodiment is slightly different from the first embodiment only in contents of cooperation between the management unit 20 and the control unit 19a of the route unit 10. Other components are similar to those of the first embodiment. Thus, only differences of the second embodiment from the first embodiment are described.

Figure 12:
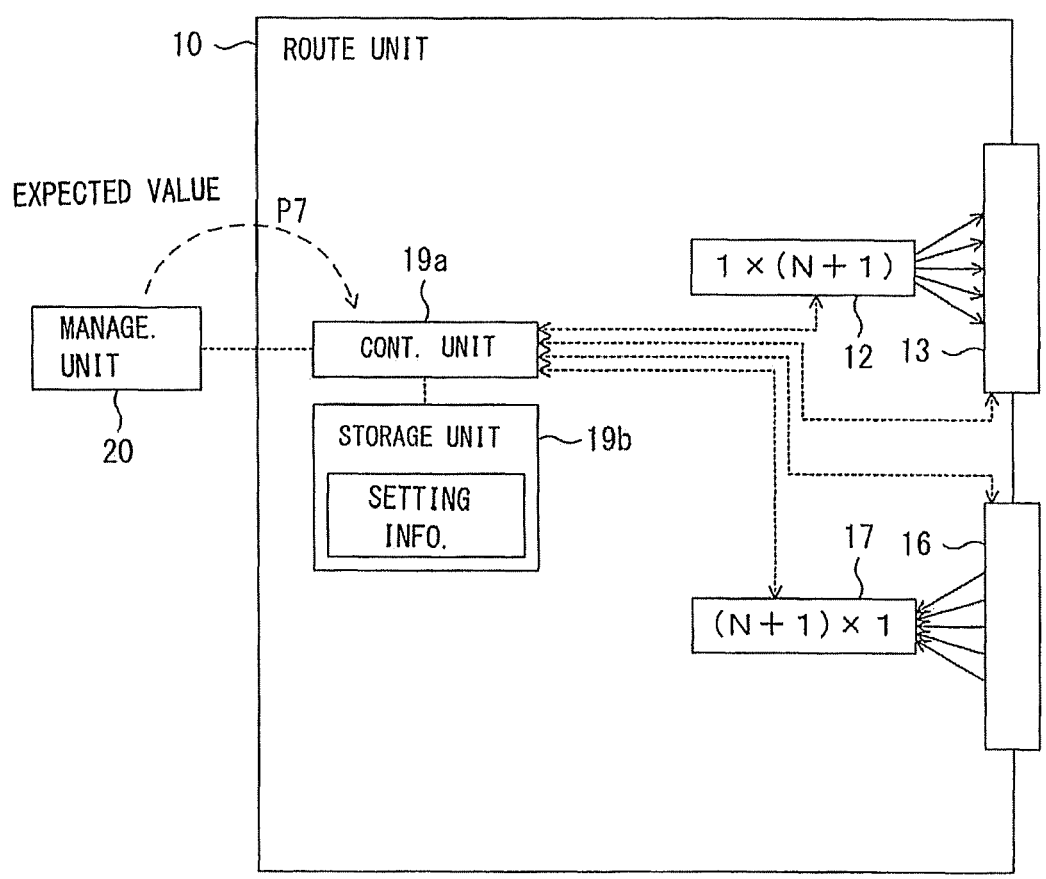
FIG. 12 is a diagram illustrating contents of processing regarding connection management of an internal port performed by a control unit according to a second embodiment.
Figure 13:
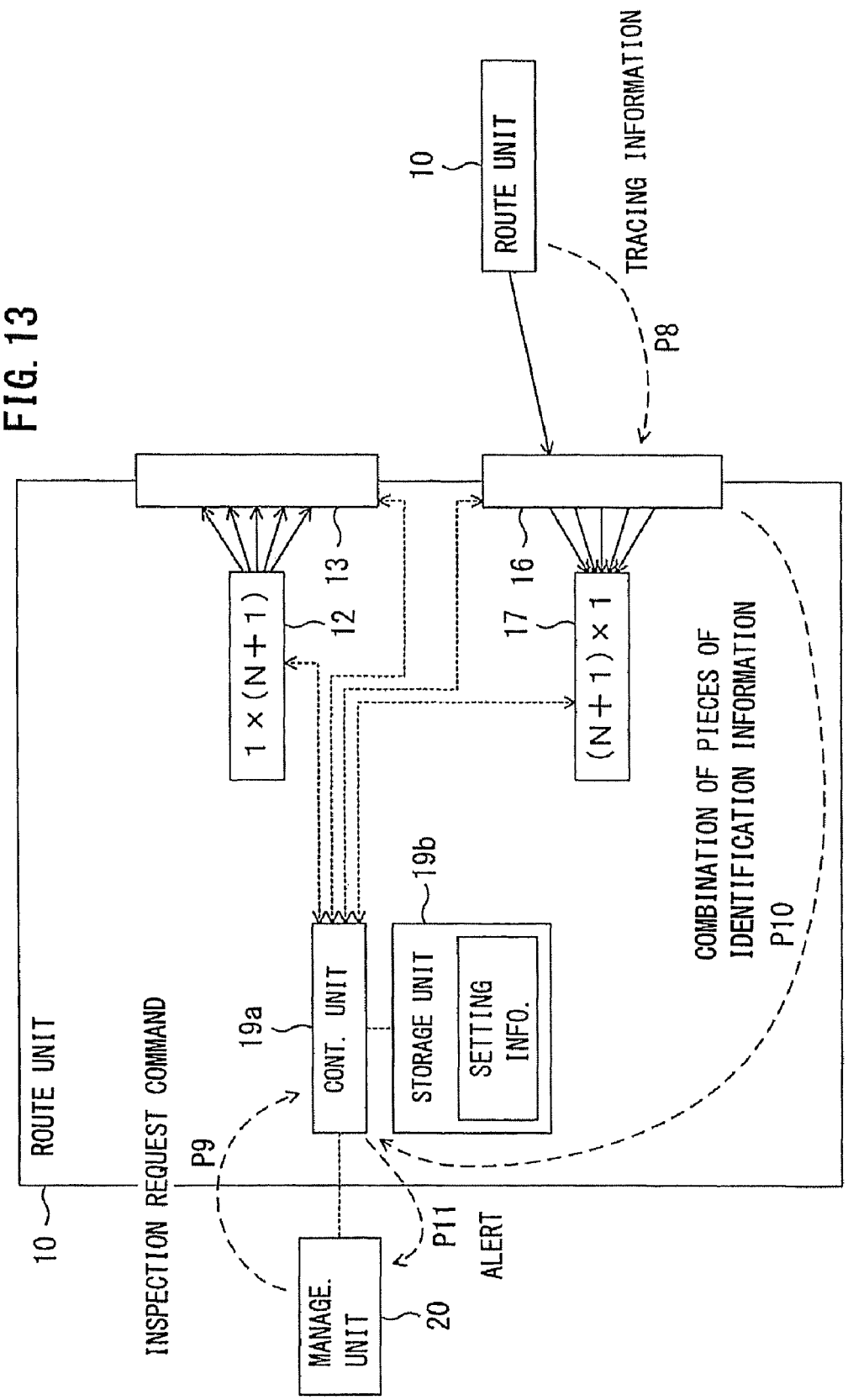
FIG. 13 is a diagram illustrating contents of processing regarding connection management of the internal port performed by the control unit according to the second embodiment.

FIGS. 12 and 13 illustrate contents of processing regarding connection management of internal ports 13 and 16 performed by a control unit 19a of the second embodiment.

In the second embodiment, the control unit 19a stores pieces of identification information of the uplink and downlink internal ports 13 and 16 of its own unit in a storage unit 19b. Each of the internal ports 13 and 16 stores identification information of its own port in its own register. In the second embodiment, a management unit 20 supplies, for a downlink internal port 16 to which no other route unit 10 is connected, identification information indicating an uplink internal port 13 of another route unit 10 to be connected to the downlink internal port 16 as an expected value beforehand to the control unit 19a. The control unit 19a stores, after reception of the identification information as the expected value from the management unit 20 as indicated by P7 of FIG. 12, the expected value and the identification information of the downlink internal port 16 of the own unit in association with each other in the storage unit 19b. It should be noted that the storage unit 19b corresponds to a second storage unit.

In the second embodiment, as in the first embodiment, when an optical fiber is physically connected to any one of the internal ports 13 and 16, as indicated by P8 of FIG. 13, identification information of an uplink internal port 13 of one route unit 10 is transmitted as tracing information to a downlink internal port 16 of another route unit 10. After reception of the tracing information, the downlink internal port 16 stores the tracing information in a predetermined register as in the first embodiment.

The management unit 20 periodically transmits predetermined inspection request commands to the control units 19a of the route units 10. After reception of the predetermined inspection request command from the management unit 20 as indicated by P9 of FIG. 13, as indicated by P10 of FIG. 13, the control unit 19a reads, from the register of the downlink internal port 16 of the own unit, identification information of the downlink internal port 16 and identification information (tracing information) of an uplink internal port 13 of the other route unit 10 connected to the downlink internal port 16. Subsequently, the control unit 19a determines whether a combination of the read identification information and tracing information (identification information) matches a combination of the identification information and expected value (identification information) stored beforehand in the storage unit 19b. When matched, the control unit 19a outputs a message indicating that a connection state is normal as a response to the management unit 20. On the other hand, when unmatched, as indicated by P11 of FIG. 13, the control unit 19a outputs a message indicating that a connection state is abnormal as an alert to the management unit 20.

Thus, according to the second embodiment, only when the management unit 20 is not notified of a combination of pieces of identification information but there is a problem with a connection relationship notified beforehand to the control unit 19a, the control unit 19a issues an alert to the management unit 20. Thus, a network administrator who operates the management unit 20 does not have to check each connection state of the route unit 10.

Third Embodiment

Figure 14:
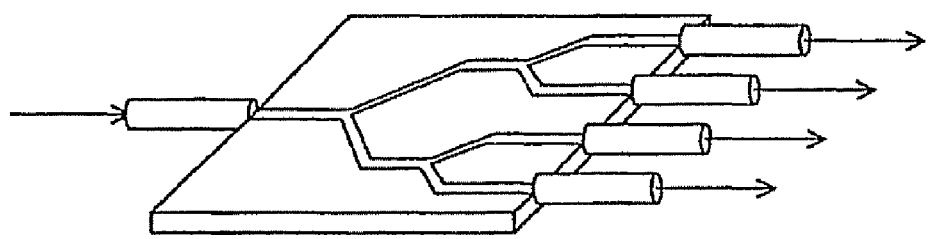
FIG. 14 is a diagram illustrating an example of a general waveguide type optical splitter.
Figure 15:
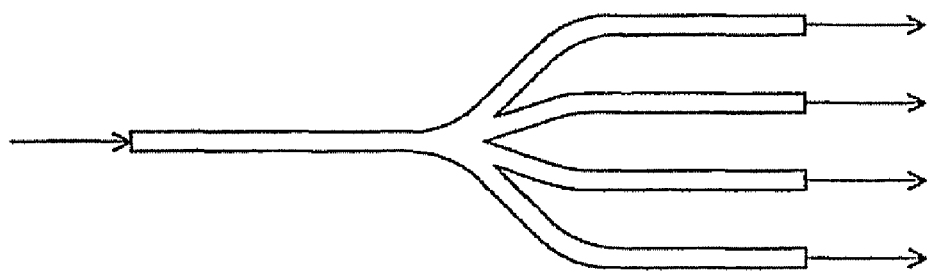
FIG. 15 is a diagram illustrating an example of a general optical fiber type optical splitter.

In a third embodiment, the 1×(N+1) optical switch 12 of the first embodiment is changed to a 1×(N+1) optical splitter. The optical splitter is an optical element that separates a completely similar multiple optical signal into a plurality of signals by branching a multiple optical signal into a plurality of systems while equally dividing its intensity. For the optical splitter, for example, a waveguide type optical splitter illustrated in FIG. 14, or an optical fiber type optical splitter illustrated in FIG. 15 can be used.

Thus, in the third embodiment, from an uplink internal port 13 of a route unit 10, a multiple optical signal input from a first optical amplifier 11 is directly output to another route unit 10 (refer to FIG. 2). In the third embodiment, the route unit 10 selects an optical signal to be transmitted to another optical transmission apparatus among multiple optical signals received from the other route units 10 by using an (N+1)×1 optical switch 17.

According to the third embodiment, an optical splitter less expensive than the optical switch 12 illustrated in FIG. 3 is used as uplink side separation means. Thus, overall manufacturing costs of an optical hub node apparatus can be reduced.

Fourth Embodiment

Figure 16:
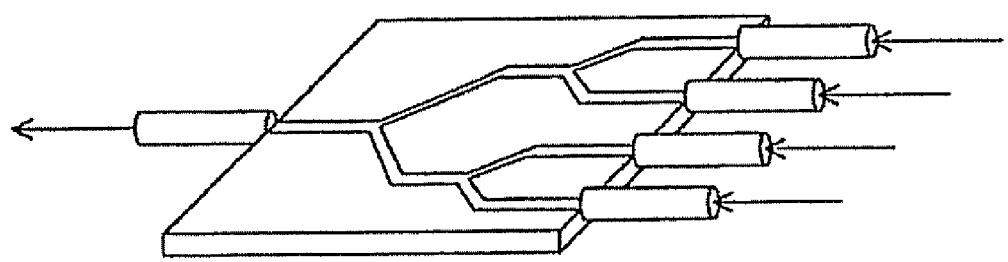
FIG. 16 is a diagram illustrating an example of a general waveguide type optical coupler.
Figure 17:
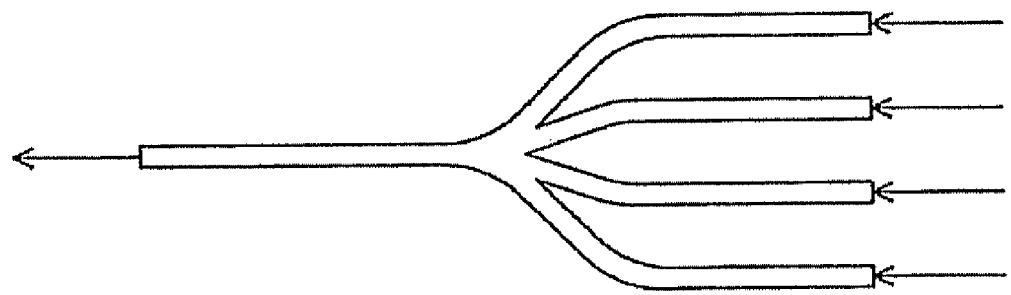
FIG. 17 is a diagram illustrating an example of a general optical fiber type optical coupler.

In a fourth embodiment, the (N+1)×1 optical switch 17 of the first embodiment is changed to an (N+1)×1 optical coupler. The optical coupler is an optical element that multiplexes optical signals of different courses by coupling them in the same course. For the optical coupler, for example, a waveguide type optical coupler illustrated in FIG. 16 or an optical fiber type optical coupler illustrated in FIG. 17 can be used.

In the fourth embodiment, selection of an optical signal to be transmitted to another optical transmission apparatus by a route unit 10 is completed at a 1×(N+1) optical switch 12 of a route unit 10 which is a transmission source of the optical signal. Thus, a downlink side route unit 10 only needs to couple optical signals input from downlink internal ports 16 by using the (N+1)×1 optical coupler to output the coupled optical signal to a second optical amplifier 18.

According to the fourth embodiment, an optical coupler less expensive than the optical switch 17 illustrated in FIG. 4 is used as downlink side coupling means, and hence overall manufacturing costs of an optical hub node apparatus can be reduced.

[Effects]

The disclosed optical hub node apparatus can be configured to include the N+1 or more route units by connecting the N or less route units selected from among the N+1 or more route units to the route unit including the N (integer of 2 or more) ports to which the other route units are detachably connected. As a result, as compared with a case where N+1 route units are completely interconnected in a meshed manner, the number of the route units can be increased. Thus, the number of the optical transmission apparatuses (number of routes, degree, or number of edges) allowed to be connected to the optical hub node apparatus can be increased as well.

Thus, according to the disclosed degree extending method, the number of optical transmission apparatuses allowed to be connected to the optical hub node apparatus can be increased.

What is claimed is:

1. A degree extension method in an optical hub node apparatus including three or more route units respectively connected to optical transmission apparatuses via routes and respectively performing bidirectional optical communication with the optical transmission apparatuses, the degree extension method comprising:

providing each of the three or more route units so as to include both N (integer of 2 or more) internal ports for the bidirectional optical communication to which other route units are detachably connected and an external port for the bidirectional optical communication to which a corresponding optical transmission apparatus is connected; and connecting, to each of the three or more route units via the N internal ports for the bidirectional optical communication, N or less route units selected from among N+1 or more route units including a route unit for degree extension that is not connected to all the other route units.

2. An optical hub node apparatus including three or more route units respectively connected to optical transmission apparatuses via routes and respectively performing bidirectional optical communication with the optical transmission apparatuses, the optical hub node apparatus comprising:

each of the three or more route units including both N (integer of 2 or more) internal ports for the bidirectional optical communication to which other route units are detachably connected and an external port for the bidirectional optical communication to which a corresponding optical transmission apparatus is connected;

wherein each of the three or more route units, via the N internal ports for the bidirectional optical communication, is connected to N or less route units selected from among N+1 or more route units including a route unit for degree extension that is not connected to all the other route units.

3. The optical hub node apparatus according to claim 2, wherein each of the three or more route units further includes:

a separator that separates an optical signal of a specified channel from multiple optical signals input from the optical transmission apparatus through the route to output the separated optical signal to an appropriate route unit in the other route units; and a coupler that couples together optical signals of one or more channels input from the other route units to output the coupled optical signal to the optical transmission apparatus through the route.

4. The optical hub node apparatus according to claim 3, wherein each of the separator and the coupler includes a wavelength selective switch.

5. The optical hub node apparatus according to claim 3, wherein:

the separator includes an optical splitter; and
the coupler includes a wavelength selective switch.

6. The optical hub node apparatus according to claim 3, wherein:

the separator includes a wavelength selective switch; and
the coupler includes an optical coupler.

7. The optical hub node apparatus according to claim 3, wherein each of the three or more route units further includes:

a demultiplexer that selects a reception destination according to the optical signal input from the separator to output the optical signal to the selected reception destination; and a multiplexer that selects optical signals from a plurality of transmission sources to input the selected optical signals to the coupler.

8. The optical hub node apparatus according to claim 2, further including a management unit that stores a connection relationship of the N ports of each of the three or more route units, wherein each of the three or more route units further includes:

a first storage unit that stores, when any one of the N ports of one of the other route units is connected to any one of the N ports of the each unit, identification information indicating the any one of the N ports of the each unit and identification information indicating the any one of the N ports of the one of the other route units connected to the any one of the N ports of the each unit in association with each other; and a notification unit that notifies the management unit of a combination of pieces of the identification information stored in the first storage unit.

9. The optical hub node apparatus according to claim 8, wherein each of the three or more route units further includes:

a second storage unit that stores, for each of the N ports of the each unit, identification information indicating a port of another route unit to be connected to each of the N ports; and an alerting unit that outputs an alert, when the any one of the N ports of the one of the other route units is connected to the any one of the N ports of the each unit, if the identification information indicating the any one of the N ports of the one of the other route units connected to the any one of the N ports of the each unit does not match the identification information indicating the port of the another route unit to be connected to the any one of the N ports of the each unit, which is stored in the second storage unit.

* * * * *